(12) United States Patent
Podduturi et al.

(10) Patent No.: US 11,228,659 B2
(45) Date of Patent: Jan. 18, 2022

(54) SYSTEM AND METHOD FOR SERVING HYPER-CONTEXTUAL CONTENT IN REAL-TIME

(71) Applicant: Keypoint Technologies India Pvt. Ltd., Hyderabad (IN)

(72) Inventors: Jayasimha Reddy Podduturi, Hyderabad (IN); Nutan ChokkaReddy, Hyderabad (IN); V. Manohar Binny, Hyderabad (IN); Harsh N. Damala, Hyderabad (IN); Sunil Motaparti, Hyderabad (IN)

(73) Assignee: Keypoint Technologies India Pvt. Ltd., Hyderabad (IN)

( * ) Notice: Subject to any disclaimer, the term of this patent is extended or adjusted under 35 U.S.C. 154(b) by 0 days.

(21) Appl. No.: 16/702,763

(22) Filed: Dec. 4, 2019

(65) Prior Publication Data
US 2020/0177699 A1 Jun. 4, 2020

(30) Foreign Application Priority Data
Dec. 4, 2018 (IN) .............................. 201841045842

(51) Int. Cl.
*H04L 29/08* (2006.01)
*G06Q 30/02* (2012.01)

(52) U.S. Cl.
CPC ....... *H04L 67/306* (2013.01); *G06Q 30/0252* (2013.01); *G06Q 30/0256* (2013.01); *G06Q 30/0261* (2013.01); *G06Q 30/0269* (2013.01); *H04L 67/02* (2013.01); *H04L 67/22* (2013.01)

(58) Field of Classification Search
CPC ....... H04L 67/306; H04L 67/02; H04L 67/22; G06Q 30/0252; G06Q 30/0256; G06Q 30/0261; G06Q 30/0269
See application file for complete search history.

(56) References Cited

U.S. PATENT DOCUMENTS

| | | | |
|---|---|---|---|
| 7,974,983 B2 * | 7/2011 | Goeldi ............... | G06Q 30/0251 707/769 |
| 8,666,980 B1 * | 3/2014 | Vora ................... | G06Q 30/0255 707/732 |
| 8,880,996 B1 * | 11/2014 | Deshpande ........ | G06Q 30/0255 715/234 |

(Continued)

FOREIGN PATENT DOCUMENTS

KR  10-2017-0123325 A  11/2017

OTHER PUBLICATIONS

Written Opinion for Korean Patent Application No. 10-2019-0158807 dated Aug. 26, 2021, 18 pages.

*Primary Examiner* — Blake J Rubin
(74) *Attorney, Agent, or Firm* — Benesch, Friedlander, Coplan & Aronoff LLP

(57) ABSTRACT

A method and a system for serving hyper-contextual content in real-time have been discussed. The method comprising: aggregating a set of information associated with one or more platforms built in a computing device; processing, by a recommendation unit, the aggregated information to identify a set of attributes, and identifying the at least one content based on any intent of one or more users at a particular time; and displaying the identified content on the computing device in real-time. The set of attributes are mapped to at least one content of the aggregated information.

12 Claims, 11 Drawing Sheets

(56) References Cited

U.S. PATENT DOCUMENTS

| | | | |
|---|---|---|---|
| 9,589,048 B2* | 3/2017 | Milton | G06F 16/285 |
| 10,585,927 B1* | 3/2020 | Liao | G06F 16/3349 |
| 10,616,406 B1* | 4/2020 | Judd | G06F 16/27 |
| 10,706,450 B1* | 7/2020 | Tavernier | G06Q 30/0625 |
| 11,100,179 B1* | 8/2021 | Zhou | G06F 16/285 |
| 2008/0270233 A1* | 10/2008 | Yip | G06Q 30/0269 705/14.54 |
| 2010/0070448 A1* | 3/2010 | Omoigui | H01L 27/14647 706/47 |
| 2010/0169067 A1* | 7/2010 | Basel | G06F 13/10 703/21 |
| 2011/0212717 A1* | 9/2011 | Rhoads | G06F 16/58 455/420 |
| 2011/0258049 A1* | 10/2011 | Ramer | G06Q 30/0273 705/14.66 |
| 2011/0264528 A1* | 10/2011 | Whale | H04L 67/18 705/14.58 |
| 2012/0005023 A1* | 1/2012 | Graff | G06Q 30/0261 705/14.58 |
| 2012/0209839 A1* | 8/2012 | Andrews | H04L 67/306 707/728 |
| 2012/0330714 A1* | 12/2012 | Malaviya | G06Q 40/06 705/7.29 |
| 2013/0053005 A1* | 2/2013 | Ramer | G06Q 30/0256 455/414.1 |
| 2013/0073388 A1* | 3/2013 | Heath | G06Q 30/02 705/14.53 |
| 2013/0159506 A1* | 6/2013 | Stern | G06Q 50/01 709/224 |
| 2013/0218885 A1* | 8/2013 | Satyanarayanan | G06F 16/335 707/728 |
| 2014/0032259 A1* | 1/2014 | LaFever | G06Q 30/0271 705/7.29 |
| 2014/0143323 A1* | 5/2014 | Posse | G06Q 50/01 709/204 |
| 2014/0257991 A1* | 9/2014 | Christensen | G06Q 30/0269 705/14.66 |
| 2014/0379696 A1* | 12/2014 | Gyongyi | G06F 16/9535 707/722 |
| 2014/0379744 A1* | 12/2014 | Kuo | G06F 16/90324 707/767 |
| 2015/0019342 A1* | 1/2015 | Gupta | G06Q 30/0269 705/14.66 |
| 2015/0025977 A1* | 1/2015 | Doyle | G06Q 30/0269 705/14.66 |
| 2015/0058345 A1* | 2/2015 | Mishra | G06Q 30/0261 707/737 |
| 2015/0088879 A1* | 3/2015 | McFadden | G06F 16/9535 707/736 |
| 2015/0120453 A1* | 4/2015 | Lee | G06Q 30/0265 705/14.58 |
| 2015/0324844 A1* | 11/2015 | Wang | G06Q 30/0243 705/14.53 |
| 2015/0348110 A1* | 12/2015 | Megdal | H04W 4/029 705/14.58 |
| 2016/0103996 A1* | 4/2016 | Salajegheh | G06F 11/3024 726/25 |
| 2016/0253710 A1* | 9/2016 | Publicover | H04N 21/4532 705/14.66 |
| 2016/0350801 A1* | 12/2016 | Vincent | G06N 20/00 |
| 2017/0046727 A1* | 2/2017 | Chau | G06Q 30/0631 |
| 2017/0085672 A1* | 3/2017 | Liu | G06Q 30/0276 |
| 2017/0180496 A1* | 6/2017 | Comstock | H04L 67/22 |
| 2017/0185666 A1* | 6/2017 | Pasternack | G06F 16/2228 |
| 2018/0040020 A1* | 2/2018 | Rian | G06F 16/9535 |
| 2018/0165770 A1* | 6/2018 | Mead | G06F 16/9535 |
| 2019/0087852 A1* | 3/2019 | Blom | G06F 16/22 |
| 2019/0163829 A1* | 5/2019 | Puri | G06F 16/9536 |
| 2019/0325081 A1* | 10/2019 | Liu | G06F 40/274 |
| 2020/0050966 A1* | 2/2020 | Enuka | G06N 20/00 |

* cited by examiner

FIG. 5A

| Application or software | Intent | Object | Category |
|---|---|---|---|
| Social networking | Like | Coffee | Food and Beverages |
| Social networking | Review | Movie | Entertainment |
| Online Instant messenger | Like | Food | Food and Beverages |
| SMS | Buy | Shoes | Accessories |
| SMS | Book | Train | Travel |
| Email | Travel | Abroad | Travel |
| Social networking | Book | Hotel | Travel |

SYSTEM AND METHOD FOR SERVING HYPER-CONTEXTUAL CONTENT IN REAL-TIME

CROSS-REFERENCE TO RELATED APPLICATIONS

This application claims priority to and the benefit of Indian Provisional Application No. 201841045842, titled "System And Method For Serving Hyper-Contextual Content In Real-Time", filed on Dec. 4, 2018, which is incorporated by reference in its entirety.

FIELD OF INVENTION

The present invention relates to process of serving hyper-contextual content to user and in particular relates to systems and methods for serving hyper-contextual content and/or services in real-time.

BACKGROUND

Contextually relevant information of a computing device is the information typically comprises of content of a web feed application, search content of a particular browser, typed content of a messenger application, user preferences of a social application, physical context like location, time, behavioral information like user's past actions in a browser or in a messenger application configured on the device, etc. The existing advertisement delivering systems are using such contextual information to provide advertisements or services to user who is using a computing device, like mobile, configured with such systems. However, such advertisements or notifications, served based on contextual information cannot be of user's interest every time and cannot be accurate to user's intent every time. Since the derived contextual information is limited to only the respective application present on the user's computing device and it cannot be mapped or associated with contextual information of another application which is already present on the user's computing device.

The advertisements or the services provided by the existing systems cannot be of user's interest and are just based on information derived from the application on which user is currently active. Such systems may aggregate information from other applications on the device, however, they can serve advertisements or services based on the information that is derived only from the application which is currently in use. They cannot combine or correlate the information derived across all the applications present on the device.

The existing browser systems or browser applications use cookies to track user's information on a webpage of one or more tabs. This information can be user's visit to webpage or user's clicks on advertisements present on webpage of one or more tabs but they cannot track and create a relation between user's information provided on or extracted from first browser and information provided on or extracted from second browser. Also these existing systems cannot display advertisements or notifications to user on any application based on the contextual information derived from second application since they cannot establish a cross application layer.

Another type of existing methods serves advertisements or services to user as notifications using contextual information identified across one or more applications present on the computing device, however in this case, each application on the computing device must belong to a single entity or each application must have a one user account which is used to access all such applications. The user account can be a Gmail™ account, Facebook™ account and the like. As the user account is associated with one or more applications, such contextual information can be derived from applications which are accessed with the user account. However, the advertisements served using such existing method may not again be of user's interest or may not again be based on user's intent since there can be at least one application on the computing device which user frequently access without accessing the user account or without using any such accounts.

The processing of input data in all the existing systems cannot be real-time, they are near real-time since the data has to be transferred to a server where the prediction process takes place and in another scenario, these existing systems do not process data derived from one or more applications at the computing device. Hence it is observed that the process of serving advertisements or services is not real-time but near real-time.

Though there may be systems which may access information across one or more applications on the computing device, they cannot predict user intent and provide advertisements or services in real-time. These systems cannot correlate the context across instant messengers or offline applications with search context across multiple browsers. Also, there are systems which aggregate information from different applications, however such applications are in built or already embedded into the computing device. These systems cannot correlate the context derived from in built applications with any information from third party applications installed on computing device. Also accurate intent cannot be predicted because of the absence of user information across online and/or offline applications present on the computing device.

SUMMARY

The following presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter.

Its sole purpose to present some concepts of the subject matter in a simplified form as a prelude to the more detailed description that is presented later.

It is therefore a primary objective of this invention to serve hyper-contextual content and/or services in real-time.

According to another embodiment of the present invention, a method comprising: aggregating a set of information associated with one or more platforms built in a computing device; processing, by a recommendation unit, the aggregated information to identify a set of attributes, wherein the set of attributes are mapped to at least one content of the aggregated information; and identifying the at least one content based on any intent of one or more users at a particular time; and displaying the identified content on the computing device in real-time.

According to an embodiment of the present invention, the one or more platforms are of similar or different type and wherein the one or more platforms are part of the computing device and an operating system information thereof.

According to an embodiment of the present invention, the method comprises transferring the aggregated information to a first database in real-time; and transferring relevant information associated with the aggregated information and the computing device to a second database in real-time.

According to an embodiment of the present invention, the method comprises transferring the relevant information from the second database to a first server so as to predict and store intents of one or more users of the computing device, wherein the predicted intents are prioritized using a set of ranking parameters, and wherein the one or more users are categorized based on the predicted intent.

According to an embodiment of the present invention, the method comprises receiving profile information and intent information of the one or more users; combining, at a second server, the profile information and the intent information of the one or more users with global intent information received from a third server to prioritize the intent information, wherein the third server is in communication with the computing device; and transferring, from the second server, the prioritized intent information along with associated identification tags to a processing unit.

According to an embodiment of the present invention, the method comprises receiving, at the processing unit, the aggregated information from the first database; associating said received data with the received prioritized intent information to identify the content to be displayed on the computing device; and transferring the identified content to the computing device.

According to an embodiment of the present invention, a system comprises a computing device; an information aggregation unit configured to aggregate information associated with one or more platforms built in the computing device; a recommendation unit configured to process the aggregated information to identify a set of attributes, wherein the set of attributes are mapped to at least one content of the aggregated information; and a content processing unit, operatively coupled to the recommendation unit, configured to identify the at least one content based on any intent of one or more users at a particular time.

According to an embodiment of the present invention, the system comprises a receiving unit operatively coupled with the computing device; a queue management unit operatively coupled with the receiving unit, a first database, and a second database, wherein the queue management unit is configured to: transfer the aggregated information to the first database in real-time; and transfer relevant information associated with the aggregated information and the computing device to the second database in real-time.

According to an embodiment of the present invention, the relevant information is transferred from the second database to a first server so as to predict and store intents of one or more users of the computing device, and the predicted intents are prioritized using a set of ranking parameters, and wherein the one or more users are categorized based on the predicted intent.

According to an embodiment of the present invention, the first server is configured to receive profile information and intent information of the one or more users, the profile information and the intent information of the one or more users are combined at a second server with global intent information received from a third server to prioritize the intent information, wherein the third server is in communication with the computing device; and the prioritized intent information along with associated identification tags are transferred to a processing unit, operatively connected to the first database and the second server.

According to an another embodiment of the present invention, the aggregated information are received at the processing unit from the first database; said received data is associated with the received prioritized intent information to identify the content to be displayed on the computing device; and the identified content is transferred to the computing device.

These and other objects, embodiments and advantages of the present invention will become readily apparent to those skilled in the art from the following detailed description of the embodiments having reference to the attached figures, the invention not being limited to any particular embodiments disclosed.

DESCRIPTION OF THE DRAWINGS

The disclosure is better understood with reference to the following drawings and description. The elements in the figures are not necessarily to scale, emphasis instead being placed upon illustrating the principles of the disclosure. Moreover, in the figures, like referenced numerals designate corresponding parts throughout the different views.

FIG. 5A illustrates examples of categorization of intents.

DETAILED DESCRIPTION

The best and other modes for carrying out the present invention are presented in terms of the embodiments, herein depicted in FIGs. The embodiments are described herein for illustrative purposes and are subject to many variations. It is understood that various omissions and substitutions of equivalents are contemplated as circumstances may suggest or render expedient, but are intended to cover the application or implementation without departing from the spirit or scope of the present invention. Further, it is to be understood that the phraseology and terminology employed herein are for the purpose of the description and should not be regarded as limiting. Any heading utilized within this description is for convenience only and has no legal or limiting effect.

The terms "a" and "an" herein do not denote a limitation of quantity, but rather denote the presence of at least one of the referenced item.

Figure 1:
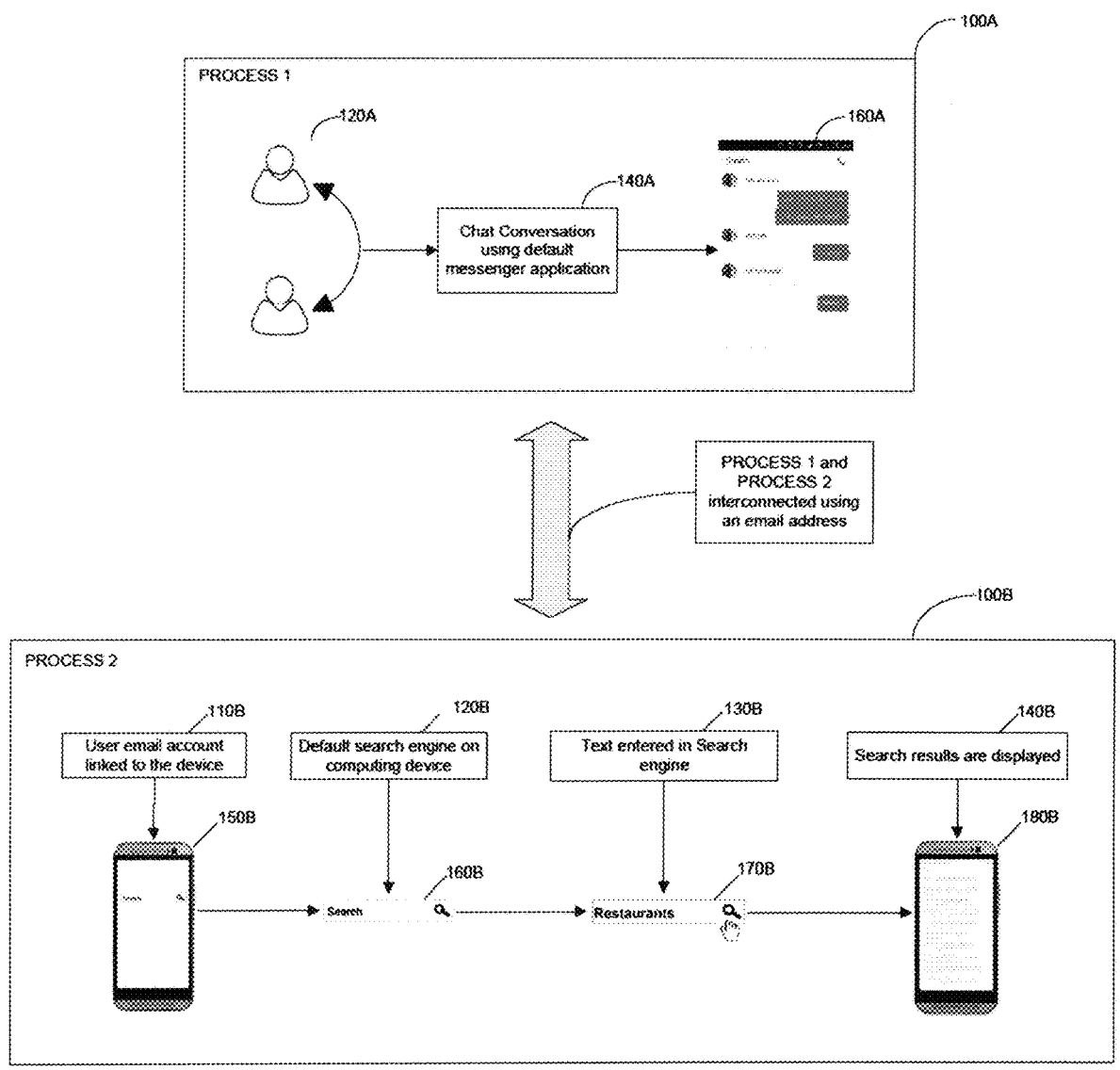
FIG. 1 illustrates a schematic representation of a prior art, where two processes are tied up via email addresses to present advertisements to user on a mobile computing device.

FIG. 1 is an illustration that shows two processes, where the current existing systems are presenting advertisements to user on first application based on context derived from a second application provided when both the applications are connected or accessed using an email address.

100A and 100B are two different processes where process 1 is a conversation between first user and second user on a default chat messenger application present on a computing device and process 2 is first user's search for his interest on a browser application present on the computing device. In an embodiment, at the time of starting the computing device or booting the computing device for the very first time, the computing device may ask for an email address and the same email address may also be used for accessing default applications or in-built applications present on the computing device. The default applications are embedded into the computing device even before user booting the device. The default applications on the device can be an instant messenger application like Message application, Hangouts™ and the like, a browser application like Chrome™, a search widget application like Google Search, a home screen application having a search option, etc. 100A of Process 1 shows 120A that first user is having conversation with second user using a default instant messenger application or in-built chat application 160A like Hangouts™ on a computing device like Android phone etc. The first user is accessing the chat application using the email address which he used for accessing the computing device. The context derived from the chat application can be stored on server or on computing device with identification code comprises of email address. The context identified in process 1 is both the users looking for an option to have lunch outside. 100B of process 2 shows stages of user searching for an option to have lunch outside using a search widget application and the search widget application 160B of computing device is associated with the same email address. User 1 typed "Restaurants" in the search place as shown in 170B to have lunch outside with user 2 and the results showing the deals of restaurants or advertisements of restaurants which are located close to his location, as shown in 180B. The nearest restaurants are identified based on his current location which can be identified or tracked based on device's Global Positioning System. The deals of first user's interest are provided based on first user's historic chat with second user. The connection between the process 1 and the process 2 is established using the email address. In this case, if email address doesn't exist, user's interest based deals or advertisements cannot be provided since the user identification cannot be performed and the deals or the advertisements can be provided based on anonymized information. Thus, the intent and persona cannot be precisely identified.

The present invention provides various systems and methods to extract information from one or more applications configured on the device to serve at least one hyper-contextual content to user in real-time on a computing device using a recommendation engine. The extracted information is termed as hyper-contextual information and is processed in intent prediction engine to predict/suggest one or more intents and a recommendation engine receives predicted/suggested intents in real-time and thereby identifies relevant hyper-contextual content or service and displays in notification area. The hyper-contextual content is displayed on a notification area using a display unit. The display unit is configured on the computing device in such a way that the content or the notification can be displayed specifically on the notification area in real-time after identifying the user's intent.

The one or more applications mentioned above can be of same type or different type. They can be a search application, an instant messenger application, a social networking application, a ticket booking application, a travel application. It is not necessary that the applications belong to same entity. The extracted hyper-contextual information can be from two different applications belonging to two or more entities, where is no relation in any manner. The present invention provides various systems and methods to bridge the gap of lack of correlation of data between different applications present on the computing device or lack of contextual knowledge that is existing between applications present on the computing device where said different applications have their own intent stack. For example, a social networking application cannot have the data from a search engine application or a game application which is not related to the social networking application.

In particular embodiments, the hyper-contextual information is derived from the computing device and is, can be at least one of the following, but not limited to, Contextual Search information, Contextual Discovery, Contextual Social information, User preference context, user application interaction context. Hyper-contextual information is stored and processed on computing device or on server or both to predict intent accurately and deliver content, services, information and the like in real-time.

Contextual Search information across one or more applications configured on computing device can be extracted from the system of the present invention in a search editor of one or more applications. It comprises of hyper-contextual information derived from current and historic information of search results across applications derived on one or more computing device and/or server, historic information of selection of search results, search results obtained among multiple search editors, recent trending search strings provided by the present invention, dynamic learning of context relation between word and phrase, dynamic learning of interaction between word frequency/phrase context, erroneous input, search context database on computing device and/or server, search context associations, ontological classification of search queries, language dictionary, ad words dictionary, user-defined dictionary, content of received message, previous text entered in any editor, phonetic input, language of input as dynamically deciphered or specified by user, voice input, emoticons input, relative keywords used in the search editor. Search context database is derived by learning all search strings entered by user. Search context associations are defined as grouping of words, associations of one search string of one browser app. to another search string of another browser application/search editor, etc. The database can be any dynamic learning structure to hold information about any one search query association or combination of search query associations, affinities, ontological classification, temporal and spatial insights, user profiling and search behavior identified based on search input across one or more search applications or the applications having search field.

Contextual Discovery information across one or more applications configured on the computing device comprises of the information derived from current and historic text shared between user and a recipient using a messaging application, current and historic input in any editor other than search editor, one or more received messages information, text entered in one or more languages, phonetic input, language of input as dynamically deciphered or specified by user, voice input, emoticons input, relative keywords used in the editor, dynamic learning of context relation between word and phrase, dynamic learning of interaction between word frequency/phrase context, erroneous input contextual database on computing device and/or server, context associations, ontological classification of words. Contextual Discovery information can be inter-related with Contextual Social information and Contextual User preference.

Contextual Social information can be the information across one or more social applications configured on user's computing device. Such information can be current and historic information derived from at least one of the following applications, but not limited to, a social networking application, a messenger application, a contact storage application and the like, configured on one or more computing devices. The derived information can be stored on a storage unit (like server) and also locally on the computing device. In particular embodiments, derived social contextual information comprises of a network which is created based on contacts of user, friends of user, favorite people of user, followers of user and the like present on one or more computing devices and the network of information is stored on the storage unit. In one of the embodiment, the information is processed by a processing unit connected to the storage unit or on computing device so that a relation can be established by interlinking profiles of one user to other user or by interlinking a first user to a second user based on the derived information. The processed information can be used for suggesting a user regarding the number of people in user's network interacted or utilized or showed interest to a hyper-contextual content. The suggested information can be displayed on notification area to the user.

Contextual User preference information can be the current and historic preferences provided by user in one or more applications, which can be email application, social networking application, gaming application, fitness application, e-commerce application, browsing application, and the like. Apart from deriving such preferences information, the systems and the methods of the present invention can also predict user preference based on the input given in editor of one or more applications.

Contextual User application interaction information can be user's historic or current interaction with one or more computing device applications, information related to sequence of using or opening one or more applications, information related to historic or current tap events implemented on at least one application of the computing device and the like.

The derived hyper-contextual information is processed by applying syntagmatic analysis to derived keywords and additionally applying factors derived from Social, User preference, User application interaction, demographics, time stamps.

The search editor as mentioned above is an area provided by an application configured on the computing device where user can enter text to search for an interest.

The application on the computing device can be a mobile application or a web application.

Figure 7:
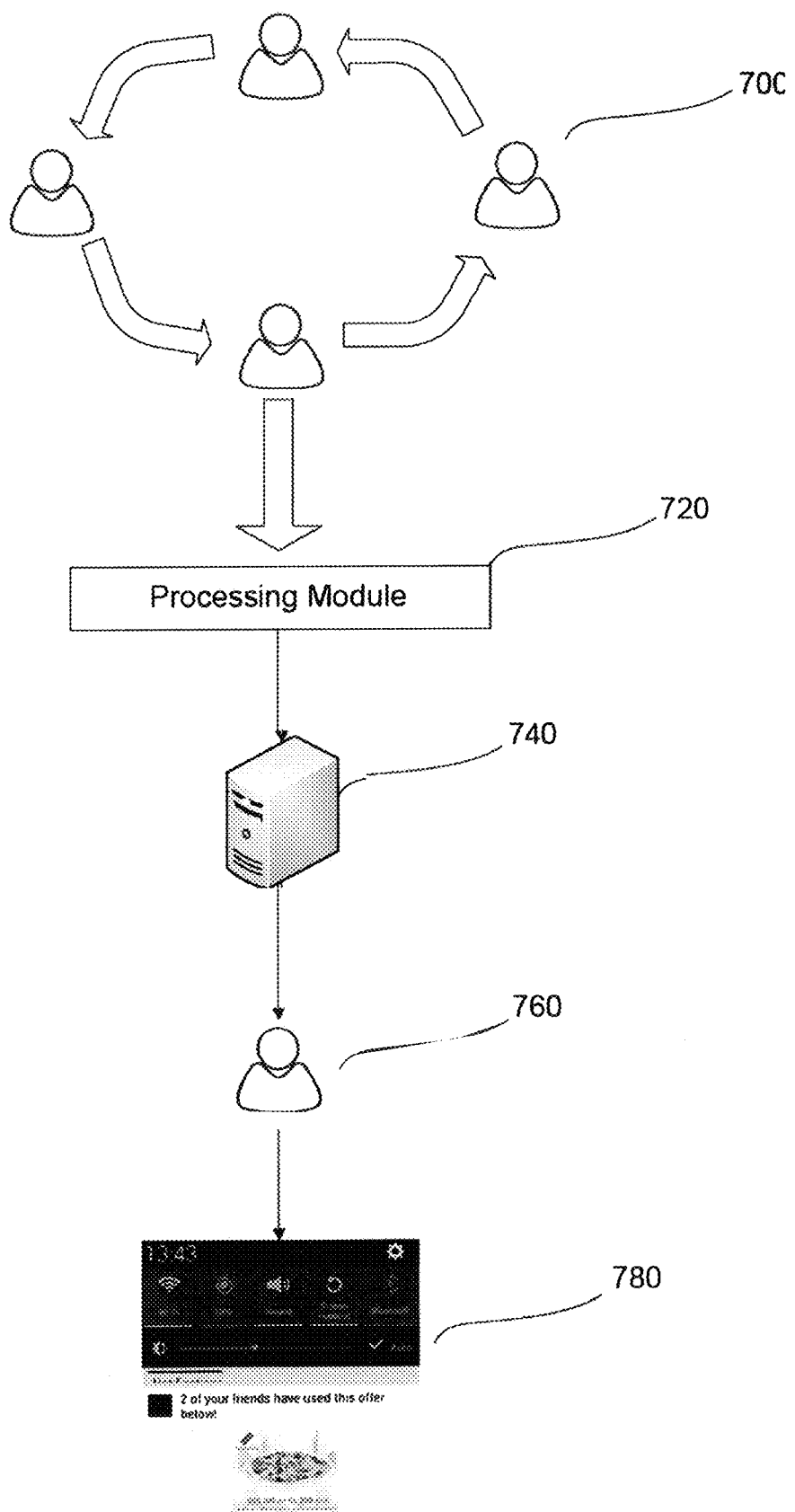
FIG. 7 illustrates relevant content notifications to computing device in real-time on notification area.

The relevant content notifications notifies user in real-time on notification area, as disclosed in FIG. 7. The derived hyper-contextual information can be processed by a service processing unit present in the recommendation engine and predicts user's intent. Certain parameters like location of the computing device, time, date can be applied to the predicted user's intent so that the one or more hyper-contextual contents are served to user in the notification area in real-time.

The present invention provides an approach where user can receive a relevant content based on the hyper-contextual information obtained from his computing device. For instance, the present invention provides a content in real-time, which is relevant and is based on user's hyper-contextual information, while user using a game application after user performed a search in a search application or a shopping application or after user had a conversation with his friend regarding purchasing an item.

In an embodiment, the present invention also serves notifications on user's computing device with information related to number of users already interacted with the respective notification in the user's location or globally.

Figure 2:
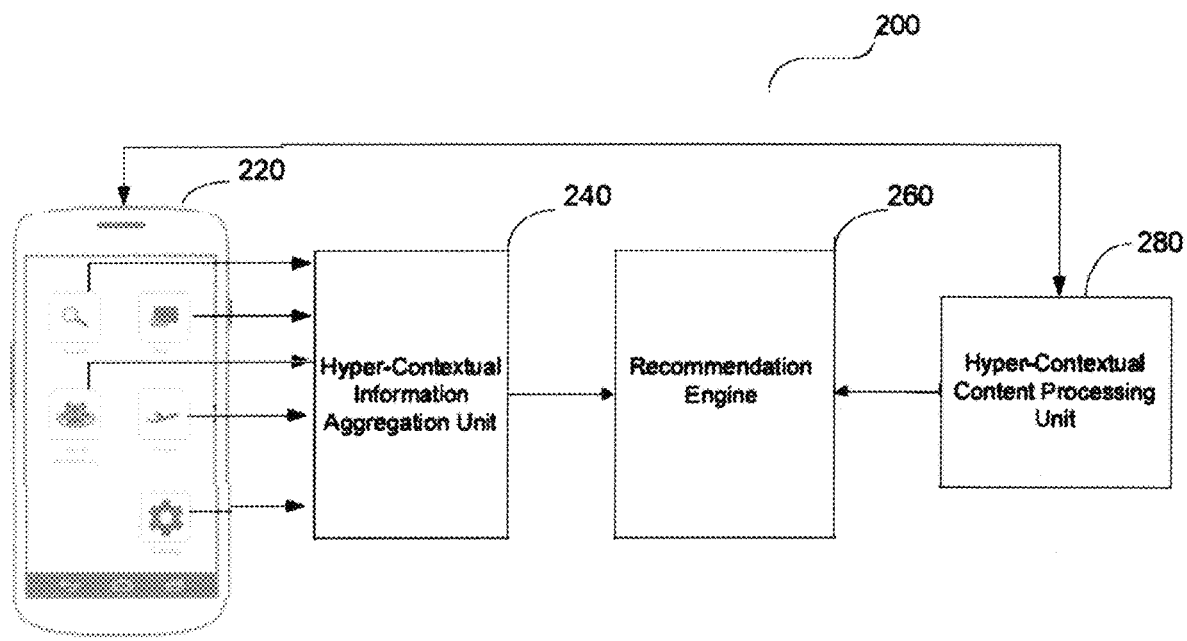
FIG. 2 illustrates a process flow of the present invention.

FIG. 02 illustrates a process flow 200 of the present invention, where the flow comprises of four key components. A computing device 220, which can be a mobile phone, a tablet, a Personal Digital Assistant (PDA) and the like, a Hyper-contextual Information Aggregation Unit 240, a Recommendation Engine 260 and a Hyper-Contextual Content Processing Unit 280. The Hyper-contextual Information Aggregation Unit 240 aggregates information from one or more applications configured on the computing device 220. The one or more applications can be similar or of different type. For example, a search related application, an Instant messenger application, a Travel application, a Social networking application, a Device Settings application which may comprise of device and its Operating system information. The aggregated information is processed by the Recommendation engine 260 such that one or more intents can be predicted. The Recommendation engine 260 is further explained in detail using FIG. 03. The recommendation engine 260 is mutually connected with Hyper-Contextual Content Processing Unit 280 to identify Content Identification codes which are mapped to at least one content. Content can be an offer, a deal, a search string, an image, a video, an audio, a promotional information, a sponsored information, a service and the like. This process is also explained in detail using FIG. 03. Once the content is identified based on current intent of user, the content is displayed in the notification area on the computing device in real-time.

Figure 3:
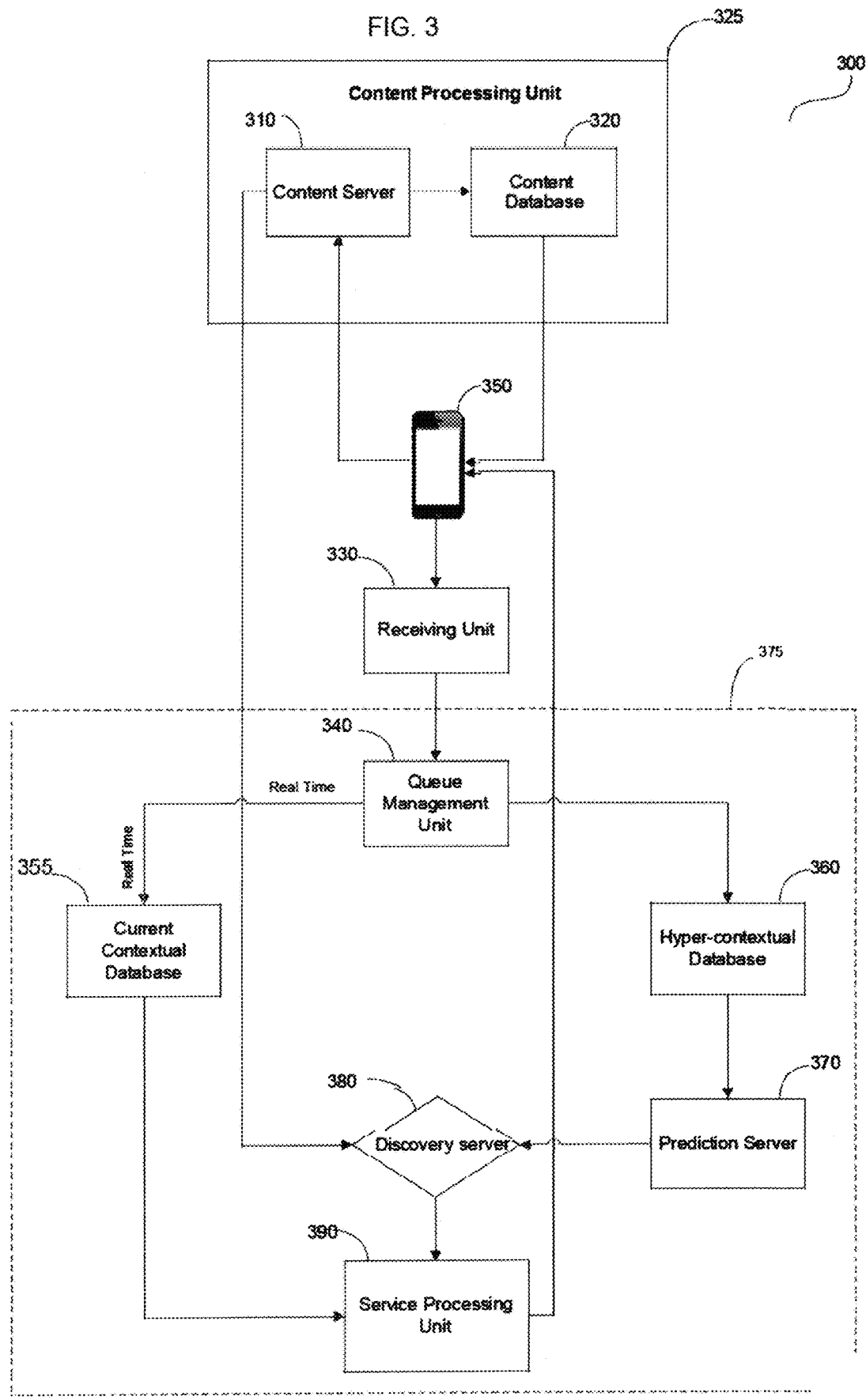
FIG. 3 illustrates an exemplary network environment associated with a computing device for delivering notifications in real-time.

FIG. 03 illustrates an exemplary network environment 300 associated with a computing device 350 for delivering notifications in real-time. The network environment 300 includes three main components, a Content processing unit 325, a computing device 350 and a recommendation engine 375. The Content processing unit 325 comprises of a Content server 310 and a Content Database 320. Although in the illustration, the computing device 350 is represented as a mobile phone, it can also be a tablet, a smart device which is configured with an operating system and with the system of the present invention.

In particular embodiments, the computing device 350 is operated by a user. User may be an individual or a group of individuals that interacts or communicates with applications configured on computing device 350. In particular embodiments, applications configured on computing device 350 are the applications installed on the computing device 350. The applications can be a browser application, a messenger application, a social networking application, a gaming application, an e-commerce application, etc. The user interacts with applications to browse content, input text, tap on content, for gesturing on content, etc. Content are services provided by a third party or a message or search strings provided by a search engine. Computing device may include functionality for determining its location, direction, or orientation, such as a GPS receiver, compass, or gyroscope. Such a device may also include functionality for wireless communication, such as BLUETOOTH communication, near-field communication (NFC), or infrared (IR) communication or communication with wireless local area networks (WLANs) or cellular-telephone network. Also may include one or more cameras, scanners, touch screens, microphones, or speakers.

The components inside network environment 300 are communicably connected to each other. The network environment 300 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these.

In particular embodiments, data, which can be contextual search information, contextual social information, contextual user preference information, contextual user application interaction information or contextual discovery information or the combination of one or more such information present in the computing device 350 is transmitted to the Receiving unit 330. The Receiving unit 330 has capability to pull up the hyper-contextual information across one or more applications configured on the computing device 350. The received hyper-contextual information is transmitted to the recommendation engine 375. The recommendation engine 375 processes the derived hyper-contextual information in real-time to predict at least one intent. It comprises of a Queue management unit 340, a Current contextual database 355, a Hyper-contextual database 360, a Prediction server 370, a Discovery server 380, and a Service processing unit 390.

The Queue Management unit 340 of the recommendation engine 375 transfers the received hyper-contextual information into the Hyper-contextual database 360 and also transfers the current contextual information like current textual input which can be current word or phrase or sentence given in editor of application or current application interaction or current gesture given on computing device, current location and the like to the Current contextual database 355 in real-time. The derived contextual information is prioritized/ranked and is stored for a particular period of time or till the time it receives the next or following contextual input information. In addition to this, the Current contextual database 355 can also be associated with a server which is storing the hyper-contextual information derived from one or more applications of one or more computing devices. The current context can be user's text input so far in an editor, current device application in use, current conversation on device, user's location, user's profile, current time and the like. The derived current context can be processed at the computing device using context processing algorithm which has the ability to perform pre-processing tasks like text tokenization by means of language rules, identifying keywords from text, identifying synonyms from text, ontological classification of the identified keywords, categorizing the applications configured on the computing device in terms of type/genre. The processed context is used to prepare and organize the user profile precisely by considering current context along with other attributes like user's historic interaction with the notifications which are delivered on a display unit, frequently used computing device applications, preferences given to computing device applications, preferences input in at least one computing device application, historic conversation happened with one or more friends on across one or more computing device applications, etc. to predict user's profile. The interaction with notifications can be like impressions, clicks, views, etc. and hence can be determined, user's favorite brand, restaurant, activity, etc. The current context is processed by means of language model, which is used to process the information by identifying type of language, n-grams of information associated with current context, comparing the language entered with dictionaries present on the computing device. In addition to these, the language model also applies syntagmatic methods to predict the current intent of user. Syntagmatic method is an analysis of syntax or surface structure of a sentence and this method is applied using parsers. At the lexical level, syntagmatic structure in a language is the combination of words according to the rules of syntax for that language.

The current contextual information is the information of what user is entering in an editor of an application or current information of user interaction with an application or current location, time.

The Hyper-contextual database 360 receives hyper-contextual information derived across one or more applications from device. Such hyper-contextual information comprises of both current and historic information and is processed in Batch wise. In an embodiment, the Hyper-contextual database 360 can be a global database present in the network environment which interacts with one or more Queue Management units and is comprised of hyper-contextual information of one or more users who interacted with applications configured on one or more computing devices where the system and method of the present invention implemented on all such computing devices. In addition to hyper-contextual information described as above, the Hyper-contextual database 360 also considers factors like number of times user interacted with the content taken place at notification area, number of times user utilized the content provided by systems and methods of present invention, number of times user ignored the content and the like.

The hyper-contextual information is transferred to the Prediction server 370 which comprises of an Intent Prediction Engine and a User Profiling Unit. The User profiling unit and the Intent Prediction Engine of the Prediction server 370 are interconnected to each other. In particular embodiments, hyper-contextual information comprises of current and historic conversation of user with friends, current and historic search information, current and historic interaction with one or more social networking applications configured on one or more computing devices, etc. The Intent Prediction Engine can predict and store intents of one or more users and the predicted intents are prioritized using a ranking system. The User profiling unit can categorize or classify users based on predicted intent.

Figure 5B:
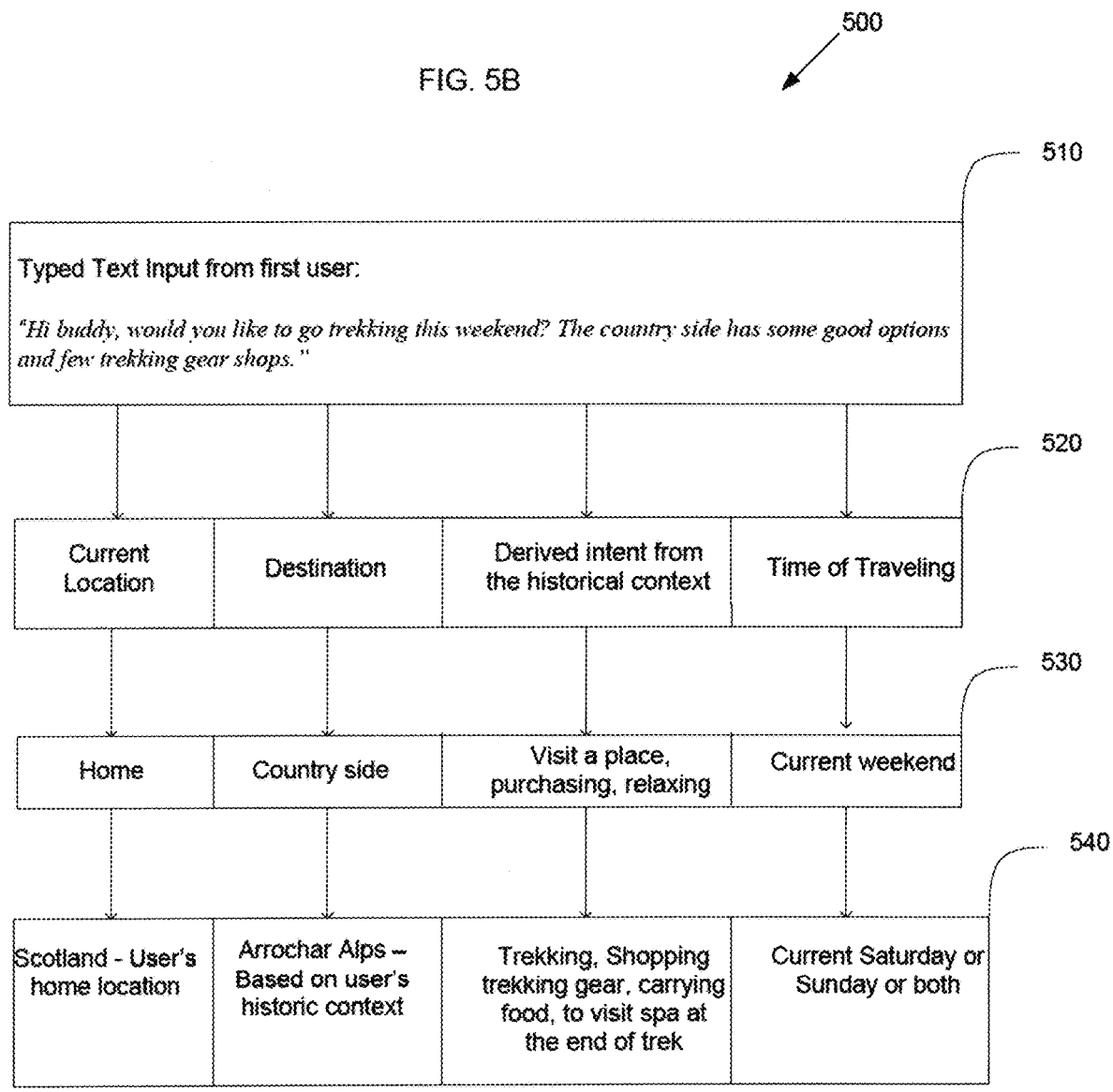
FIG. 5B illustrates flow of deriving intents from typed contents

The flow of deriving intents from the above said example is well illustrated in the FIG. 05B. 510 represents the text typed by the first user. The first level of factors derived from the text is shown as 520. The current location of the first user is identified by the first user's computing device GPS data and other factors include but not limited to destination, intent, travelling time are derived from the text typed by the first user. The obtained factors are further correlated with the historic context of the first user across one or more applications to derive the actual intent of the user. The second level of factors, shown as 530, include but not limited to, home, country side, visiting a place, purchasing intent, relaxing intent, current weekend. The second level of factors is derived by considering the text typed by the first user and the historic context across one or more applications on the computing device. Based on these factors, the appropriate location of the first user and the future intents are derived, and are shown as 540. First user's location is identified as home and the location of home is identified as Scotland, his interest towards country side trekking is considered as destination point and identified as Arrochar Alps and the derived intents are predicted as trekking, shopping trekking gear, carrying food, visiting spa and the like. The time to travel is identified as current weekend, which can be Saturday or Sunday or both. The identified hyper-contextual information is used to serve the type of hyper-contextual content or the type of search advertisement or type of sponsored search string to user till user reaches the destination location or till the planned date approaches. The type of content can be changed dynamically on timely basis and user's preferences. For example, user may receive initially search advertisements related to travelling to reach destination location and may receive search advertisements related to bus travels or cab travels but later on as the weekend approaches, if there is any offer is available with respect to bus travels or cab travels, the search advertisements are changed dynamically or periodically.

Also, the search advertisements are changed dynamically if there is any offer related to flight fare available at that moment, based on the current trends followed to visit a place, based on climatic condition to visit a place. Such search advertisements on flight fares are served to user dynamically based on user's budgeted amount information for the weekend trips, user's intent, which is obtained from user's recent and past activities and interactions across multiple device applications. One such activity can be user's input across multiple device applications. Further, same search advertisements or search strings can be served to user for a time frame which could be a day, a week, a month, a quarter of a year till the user approaches the travelling plan or till user reaches the destination location. Once the time frame is expired another search advertisement/search string can be served to user for the time frame as discussed.

The system of the present invention is used to perform actions in real-time. For example, if there is a cricket match going on, the scores of the particular match is displayed to user on the display unit when the user is engaged in a conversation related to sports or cricket or when the user is searching for the sports/cricket. The scores are refreshed and provided on real-time basis to user.

Figure 4:
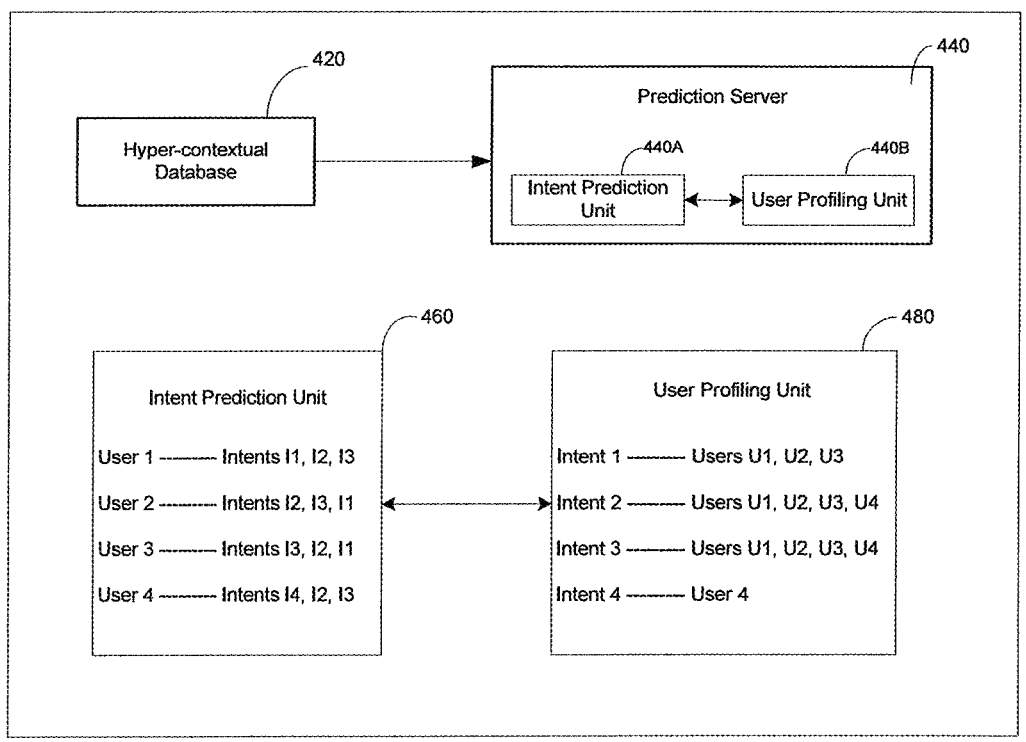
FIG. 4 illustrates an exemplary user profiling based on predicted intent.

According to FIG. 04, in the prediction server 440, the user profiling unit categorizes users based on predicted intent. Once the intents are predicted for a user, all the intents are prioritized. In addition to this, all the intents of one or more users are considered and are used to categorize user. For instance, if there are four users, U1, U2, U3 and U4, the intents of four users are ranked initially and separately. For user U1, intents are I1, I2, I3, for user U2, intents are I2, I3, I1, for user U3, intents are I3, I2, I1 and for user U4, intents are I4, I2 and I3 prioritized based on current contextual information. Based on this information, users are categorized for each intent, for instance, for intent I1, users U1, U2 and U3 are considered and similarly, for intent I2, users U1, U2, U3 and U4 are considered and so on. In an embodiment, the user profiling is illustrated in FIG. 4.

The Content server 310 of the Content processing unit 325 comprises of global intent information mapped to one or more content identification codes. In this component, the global intent information is ranked as per the impressions and/or interactions with the content provided to the respective computing devices. The prediction server 370 combines the user profiling information and global intent information from the Content server 310 at the Discovery server 380 and transfers the prioritized intent information along with the respective content identification codes to the Service Processing unit 390. The contextual information from the Current contextual database 355 is associated with the information received from the Discovery server 380 to make the system and method of the present invention a real-time process and the final content is identified and served to the computing device 350. The complete information is then transferred to the computing device 350. A prediction engine is configured on the computing device 350 where the current contextual information is processed by means of a grammar rule to determine an intent. The prediction engine utilizes the information received from the Service Processing unit 390 to serve each user a content that is relevant and accurate in real-time.

The Discovery server 380 is present in the network environment 300 to map one or more intents with one or more sets of content identification codes in real-time. The Discovery server 380 can be a SLOR, MySQL database, a PostgreSQL database, a MS SQL database, a SQLite database, Oracle SQL database. The Discovery server 380 receives one or more sets of content identification codes from the Content server 310 of the Content processing unit 325. The Content server 310 can be Amazon™ server, Google™ server, IBM™ server, etc., comprises of one or more content identification codes which are associated with respective content stored on the Content Database 320. Content can be a search string, a service, a sponsored text/image/video, a promotional text/image/video, an offer, a deal and the like. In the present invention, the content identification codes which are mapped to one or more intents are transmitted to the Service Processing unit 390 in real-time or batch wise. The Discovery server 380 also receives mapping information from the Content server 310 which is the information of content identification codes mapped to at least one category or object or intent.

Pre-defined mapping information is the information of content identification codes mapped to at least one category or object or intent. This information is present on the Content server 310 and the information is created based on information identified globally.

The Service processing unit 390 is inter-connected with the Current contextual database 355 to determine current, relevant and accurate intent or object or category and the respective set of content identification codes. In the event when there is no historic information, the service processing unit 390 utilizes current contextual information from the Current contextual database 355 and pre-defined mapping information from the Content server 310 to notify user with relevant content. The information on mapping content identification codes to at least one intent is transmitted to the computing device 350 and is ranked locally on device. The content identification codes which are above threshold level are forwarded to local cache (on the computing device 350) if present or to the Content server 310. The codes are further transmitted to the Content server 310 to determine the relevant content received from the Content Database 320.

The historic and current information extracted from the applications present on the computing device can be stored locally on the computing device and can be processed locally on the computing device to predict one or more intents. The predicted one or more intents may be transferred to the server to identify and serve a hyper-contextual content in real-time by considering local hyper-contextual and global hyper-contextual information. It is not necessary to transfer the predicted intent from computing device to server since as per the present invention, the information is stored locally on the computing device to achieve real-time process.

In an embodiment, the present invention serves hyper-contextual content based on hyper-contextual information associated with one or more processes. For instance, user is having a conversation with his friend on an Instant Messenger application present on his computing device. The conversation is related to a movie plan over the upcoming weekend and also identified a specific movie which he wanted to go. The conversation on the Instant Messenger application can be considered as Process 1. The user now wanted to search for the movie trailer using a Search application present on his computing device. The present invention considers this a Process 2 and also aggregates information associated with this process and correlates with the information associated with Process 1 in real-time. Then, user wants to book movie tickets using a Ticket booking application on his computing device. When user opens the Ticket booking application, the present invention identifies that as a next process (Process 3) in real-time and considers the factors like type of application, time, and correlates these factors with the combined information obtained from Process 1 and Process 2 in real-time and predicts at least one intent. Even before user entering text or while entering text related to the movie to book the tickets in Ticket booking application, a notification is provided, in real-time, to the user with a hyper-contextual content which can be an offer or deal related to the movie for which user wanted to book the tickets. Also, the offers or deals related to Snacks during Movie Intermission or offers or deals related to nearby Shopping place where user is watching movie can be provided before user going to watch movie or till the time user watches movie or till the time user is in the respective location. In this case, the hyper-contextual content is more than one, displayed to user in real-time. The number of Processes is not limited to three, it can be more than three depending on the user's interest or preference. The system of the present invention correlates such information identified across one or more processes in real-time to provide user a relevant hyper-contextual content. The hyper-contextual content can be advertisement or service pushed to the customer device based on his intent.

The present invention also provides a new prediction model to process the hyper-contextual information at computing device locally with or without transmitting the information to network environment 300 by means of a prediction engine incorporated along with the systems and methods of present invention. The prediction engine derives information across one or more applications present on the computing device and processes the hyper-contextual information in real-time to classify or label the derived information into intent, object, category by using Parts of Speech tagging, Syntagmatic methods. In grammar, a part-of-speech (POS) is a linguistic category of words, which is generally defined by the syntactic or morphological behavior of the word in question. Automatically assigning POS tags to words plays an important role in parsing, word sense disambiguation, as well as many other NLP applications. For an instance, if the historic information contains a text message saying "I have to travel to Canada". The text is tagged initially to at least one of the components of Parts of Speech and based on the tagged information at least one word of the input text is categorized or labelled to an object. In this instance, "Travel" is tagged to "Verb" and is categorized as "Intent" and "Canada" is tagged to "Noun" and is categorized as Place. Along with this information, the prediction engine, also considers date, time, location, application type, historic intent stack, etc. In case of multiple intents are identified, weight is given to other categories like application type, location. For another instance, if multiple intents eat, drink, travel, watch are identified in real-time and if the underlying/active application on the computing device is related to travel services, travel intent is prioritized. The categorization is illustrated in FIG. 05A. Also, in case of word sense disambiguation, if we consider the word "bank", it has many implications for instance, one is when used in financial sectors and another is when used with respect to water bodies where it may refer to river bank. Similarly, for the word "serve", it can be used in many instances, for example when a volleyball player "serves" the ball, when a waiter "serves" drink, etc. Such ambiguities can be resolved by considering the previous context, current context, application under use, location, etc.

In an embodiment, system of the present invention is effectuated through an input unit for one or more applications present on the device to input text, emoticons and the like. Input can be a tap input, a gestured input, a voice input and the like. The input entered can be in the form of text in any language, emoticon, symbols and the like across one or more applications, which can be a chat application, browser application, social application, gaming application, etc. and the input is extracted and stored either on a server or locally on the computing device. The recommendation engine processes the extracted input to predict one or more user's intent in real-time. The predicted intent mapped to one or more hyper-contextual contents which can be served to user on a notification area by display unit.

In another embodiment, system of the present invention can be a package unit integrated to one or more computing devices at an operating system level or application to extract information of device and information across one or more applications. Such extracted information can be processed under network map 300 in real-time to predict one or more user's intents and the predicted intents are mapped to one or more hyper-contextual contents which can be served to user on a notification area by display unit. If there is more than one content identified for one intent, a ranking process can be used to provide a relevant content. The package unit can also be integrated to one or more applications on the computing device.

Yet in another embodiment, the system of the present invention can retrieve the content from third party server, if the content is not readily available within content server.

Also, the system of the present invention can be a package unit integrated to at least on application which is already configured on computing device. Now, the system acts as predictive engine to any application that is configured on computing device but not integrated with package unit of present invention.

In another aspect, the system of the present invention can be an input unit and a package unit. In such case, at least one computing device is configured with either input unit or package unit of the present invention or both. The prediction server 370 of FIG. 03 performs user profiling based on the predicted intents. Each intent can be associated to at least one user profile and the information of profile—intent association is stored on Discovery server 380. Such associated information can be provided to content providers to target at least one user profile for delivering hyper-contextual content on notification area in real-time, wherein the intent is predicted based on hyper-contextual information derived across one or more applications configured on one or more computing devices. The intent can be predicted either on the computing device or on the network environment 300 as illustrated in FIG. 03. The hyper-contextual information comprises of Contextual Search information, Contextual Discovery, Contextual Social information, User preference context, User application interaction context across one or more computing devices. Once the one or more intents are predicted, segmentation of users takes place.

Figure 6:
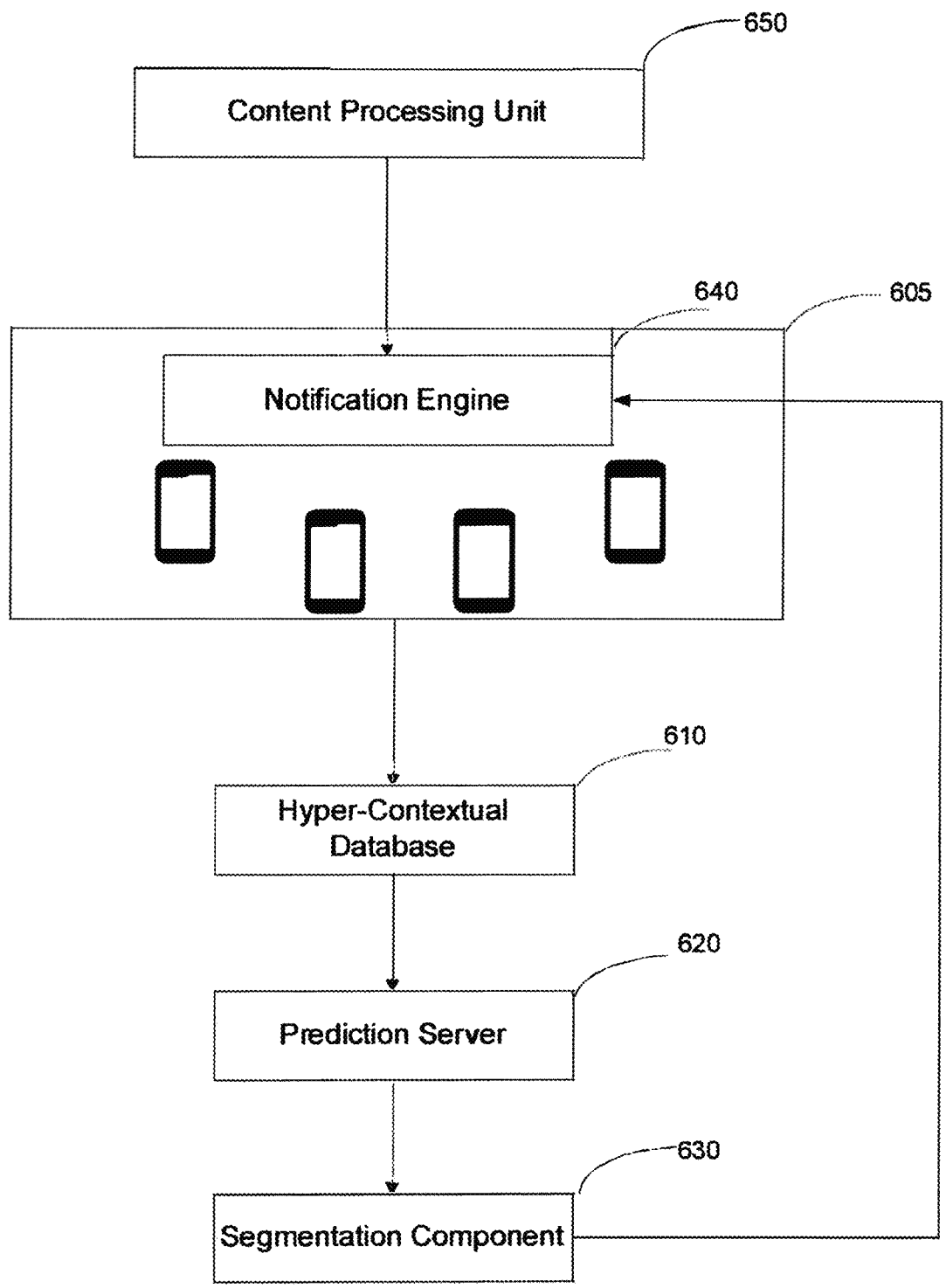
FIG. 6 illustrates a process flow to target a set of users based on intents in real-time.

FIG. 06 illustrates a process flow 600 to target a set of users based on intents in real-time. Some of the components or every component of the process flow can be present at the computing device or at the server. The component 610 comprises of hyper-contextual information derived from one or more computing devices of one or more users as shown as 605. Each hyper-contextual information is labelled to an identification code which is given to each computing device of user as a process of user profiling. Each hyper-contextual information is processed separately in the prediction server 620 which is similar to prediction server 1070 of FIG. 10 to predict one or more intents. Based on one or more intents, the identification codes are segmented and hence users are segmented in the segmentation component 630. The segmentation component 630 is connected to a Notification engine 640 which receives information of intent to a content identification code map from Content processing unit 650 which is similar to Content processing unit 1025 of FIG. 10. The notification engine 640, integrated in the computing devices, receives information of at least one intent from a segmentation component 630 and also receives information of intent to a content identification code map from a Content processing unit 650 to target users belonging to a particular intent by means of the segmentation component 630. In an embodiment, the prediction process of the present invention is used to provide or serve relevant content on user's computing device. Since the hyper-contextual information also comprises of social networking information and the hyper-contextual information from one or more computing devices can be stored on a Hyper-contextual database 1060 of the network environment, the user can receive the content on display unit as a notification along with the information of number of users in his network, who are interested to view the content or utilized the displayed service as illustrated in FIG. 07.

In a typical embodiment, intents are classified into active and passive signals. For example, if a user is having a conversation with his friend, the intent derived from text typed by user is considered as active intent signal and language which user selected to type, time stamp are considered as passive intent signal. The present invention uses both active and passive input signals to derive an intent stack which is further processed in real-time to serve a content relevant to user.

Figure 8A:
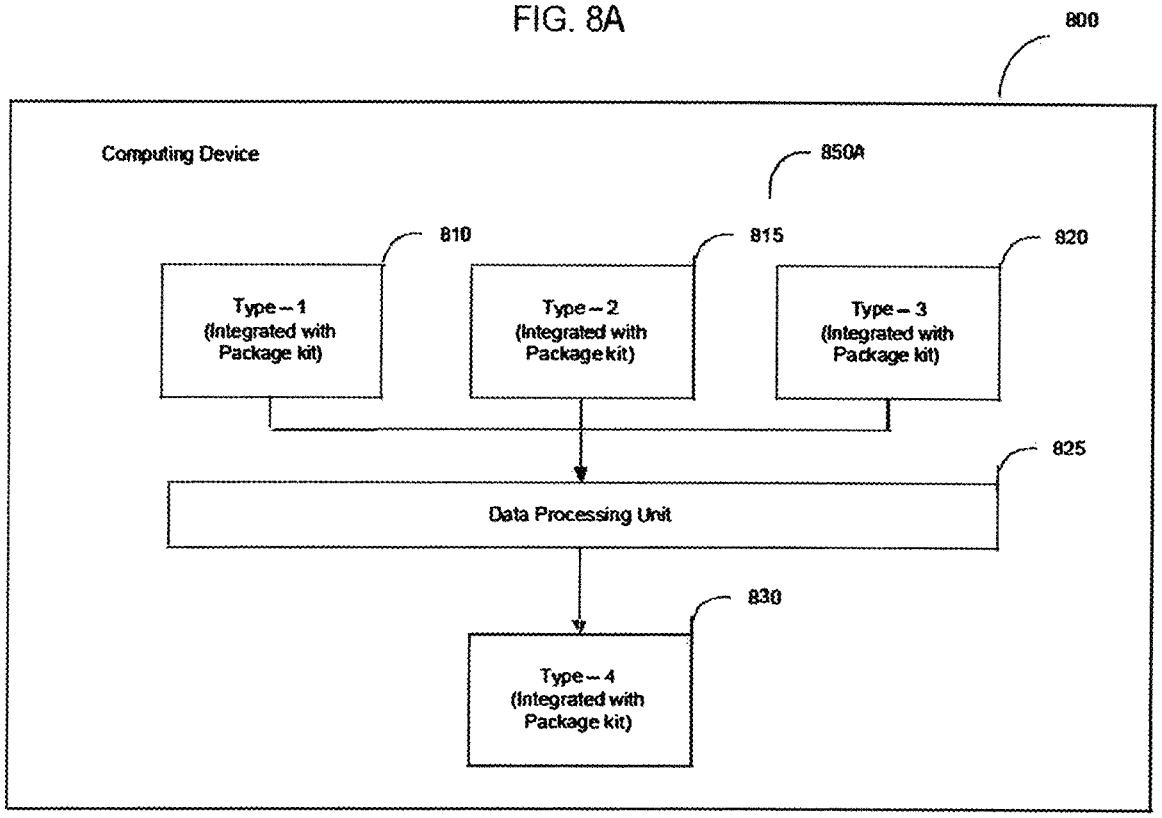
FIG. 8A and FIG. 8B illustrates two processes 800 of serving content based on data/information derived from applications configured on computing device.
Figure 8B:
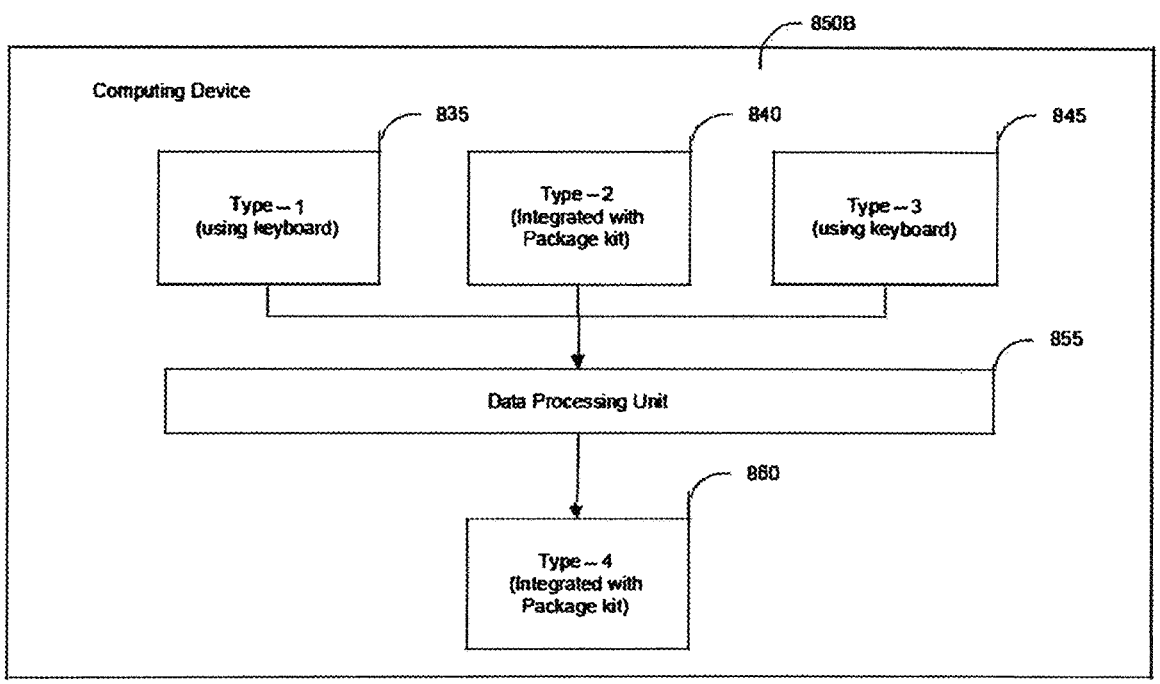

FIG. 08A and FIG. 08B illustrates two processes 800 of serving content based on data/information derived from applications configured on computing device. One of the two processes in FIG. 08A is existing/prior art which is represented as 850A and the other one in FIG. 08B is the process involved in the present invention, which is represented as 850B. The process 850A, which involves existing methods, comprises of a computing device with three types of applications, 810, 815, 820. The applications are integrated with a package kit, for example, a software development kit or the applications belong to same entity or same service provider and the applications can be same or different type. The Data Processing Unit 825 derives data from such type of applications and process and provide content to user on another application which is either one of the three types of applications or the fourth type of application. However, in the existing methods, there is no process which teaches deriving information from applications belong to different entities/service providers or the software development kit belong to different entities/service providers.

The present invention overcomes such instances by acting as keyboard or any other input system that can have access to interact one or more types of applications configured on a computing device. 850B is such process where three types of applications are interacted by the system of present invention. The applications can be interacted using an input means, for example, a keyboard application and in the event where there is no input means, such applications can be integrated with a package kit, a source code, a plug-in since the system of the present invention can be provided as a keyboard, a source code, a package kit, a plug-in to one or more applications. Once the system of the present invention is enabled, the Data Processing Unit 855 derives data from the applications in real-time and analyze in real-time to predict one or more intents. A relevant content is then provided to user based on the predicted intent. For instance, if a user uses keyboard application on Type-1 application which is an instant messenger and having conversation related to shopping and then opened up Type-2 application which is an e-commerce application, to check the product of his interest and after identifying he is looking for the product details on Type-3 application which is a search application. The Data Processing Unit 855 now derives data and identifies intent which is purchasing a product and when user opens up the e-commerce application of Type-2 or another application like instant messenger of different type than Type-1, to have a conversation with another friend, the system of the present invention provides content which can be offers/deals related to product of user's interest on notification area using a display unit. The notification area can be on top of keyboard, hyper-contextual bar, notification pane of computing device and the like. For illustrating purposes, 4 types of applications are shown but the number of applications are not limited, they can be less or more than 4 depending upon the type of data from such applications on the computing device.

Figure 9:
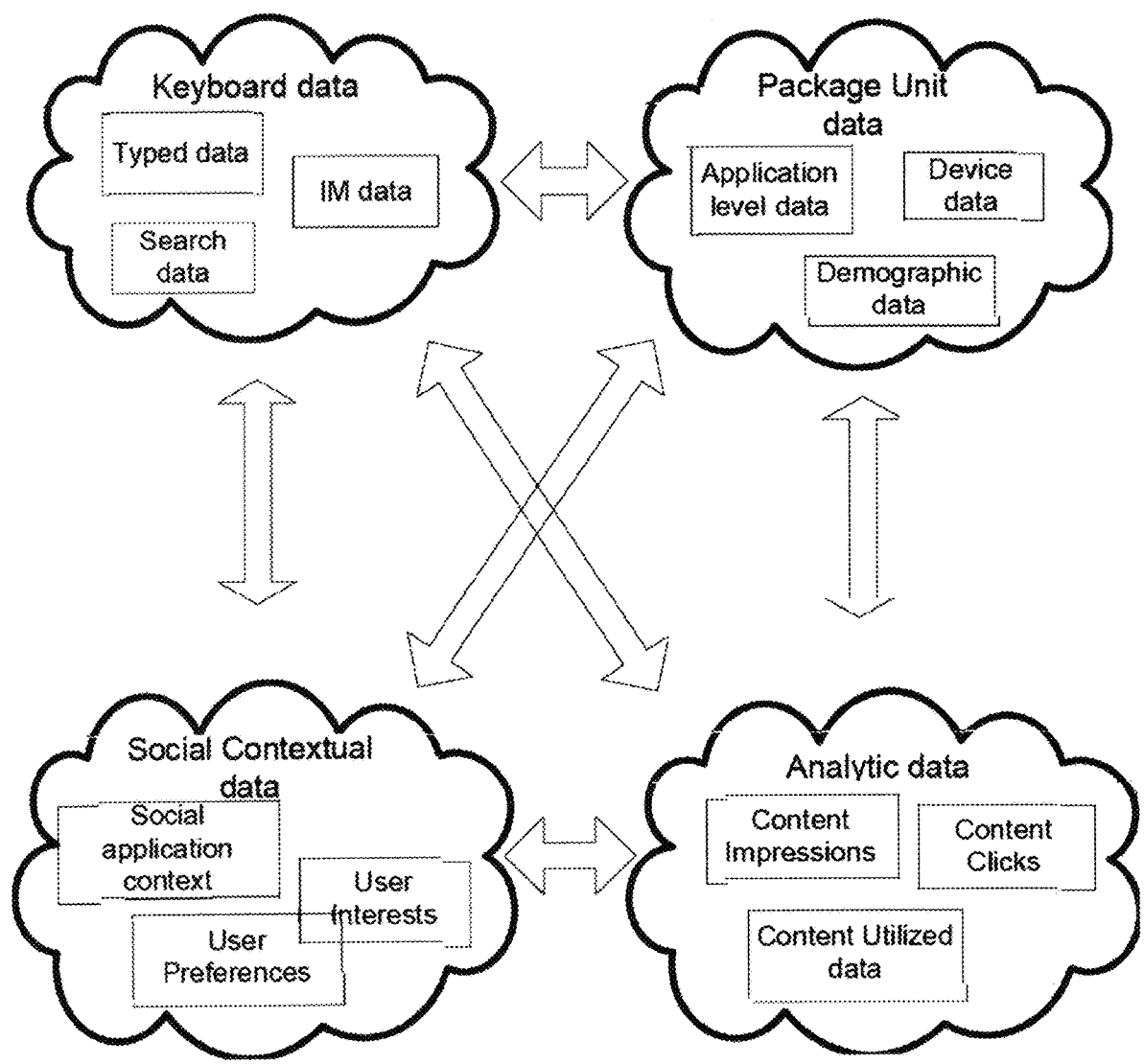
FIG. 9 illustrates the type of data or information, which is termed as hyper-contextual information, being aggregated from the computing device in an embodiment.

FIG. 09 illustrates the type of data or information, which is termed as hyper-contextual information, being aggregated from the computing device in an embodiment. The type of data can be keyboard data, package unit data, social contextual data, and analytic data. The keyboard data can be the data derived or extracted from an application that is using keyboard, for instance, an Instant Messenger application, a Search/Browsing application where keyboard is used to enter text. Likewise, any application that uses keyboard to enter text or emoticons. The package unit data can be the data derived or extracted from an application that is integrated with package unit of the present invention. The package unit can be a Software Development Kit (SDK), a Source code integrated with the application or a plug-in or add-on configured to the application. The social contextual data can be the data derived or extracted from one or more social applications, for instance, contacts of user, friends of user, favorite people of user, followers of user, user interests, user preferences, etc. The analytic data comprises of clicks, impressions of one or more contents and also the information on whether the content is utilized or not. All such type of information get aggregated from the computing device and transferred to Recommendation engine for predicting at least one intent.

Figure 10:
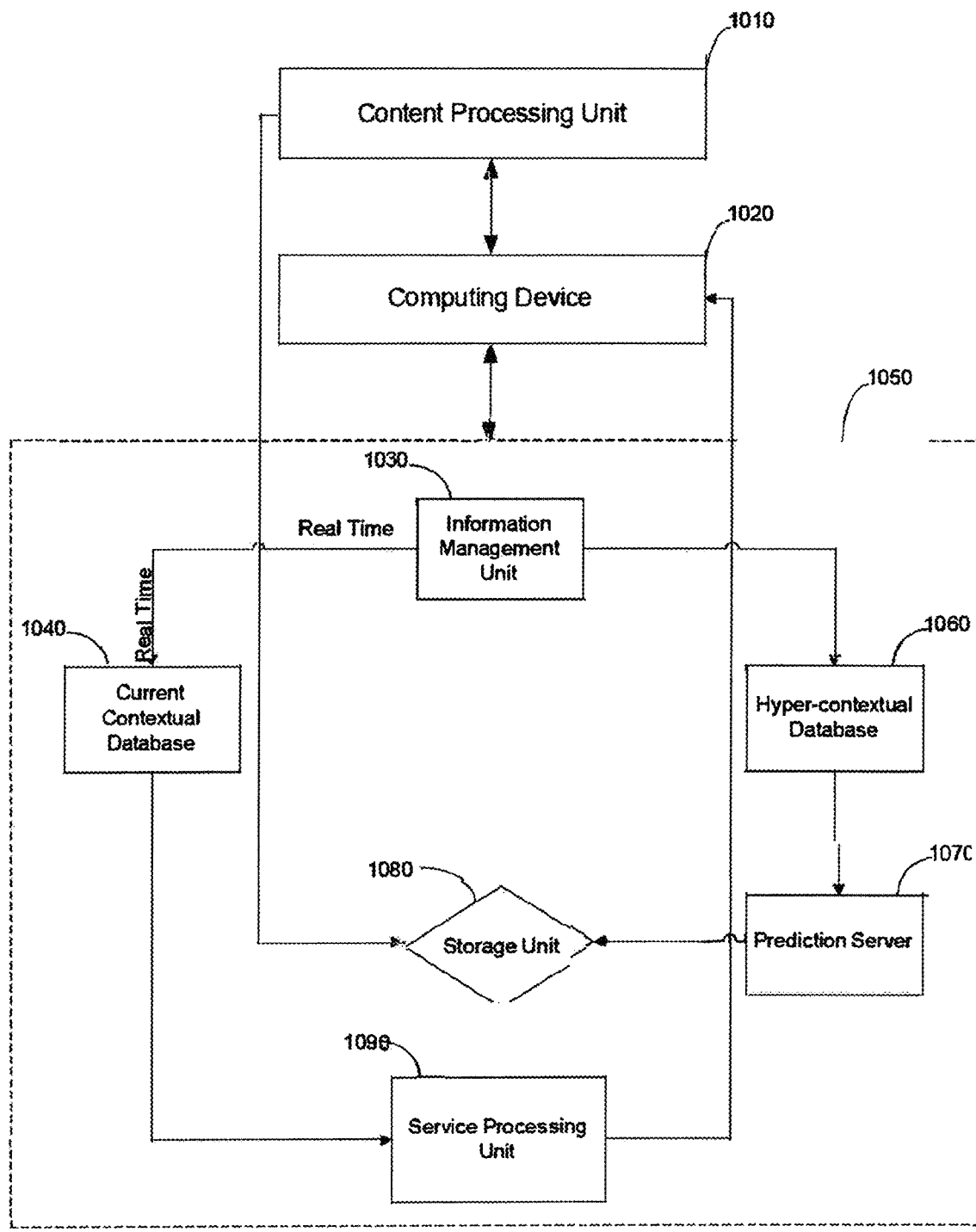
FIG. 10 illustrates the process of predicting intent and the process of serving content on the computing device.

FIG. 10 illustrates the process of predicting intent and the process of serving content on the computing device. The extracted hyper-contextual information is transmitted to recommendation unit 1050. The recommendation unit 1050 processes the derived hyper-contextual information in real-time to predict at least one intent. The recommendation unit comprises of Information Management unit 1030, a Current contextual database 1040, a Hyper-contextual database 1060, a Prediction server 1070, a Storage Unit 1080, and a Service processing unit 1090. The Information Management unit 1030 of the recommendation engine 1050 transfers the received hyper-contextual information into the Hyper-contextual database 1060 and also transfer the current contextual information like current textual input which can be current word or phrase or sentence given in editor of application or current application interaction or current gesture given on computing device, current location and the like to the Current contextual database 1040 in real-time. The derived contextual information is prioritized/ranked and is stored for a particular period of time or till the time it receives the next or following contextual input information. In addition to this, the Current contextual database 1040 can also be associated with a server which is storing the hyper-contextual information derived from one or more applications of one or more computing devices. The current context can be user's text input so far in an editor, current device application in use, current conversation on device, user's location, user's profile, current time and the like. The derived current context are processed at the computing device using context processing algorithm which has the ability to perform pre-processing tasks like text tokenization by means of language rules, identifying keywords from text, identifying synonyms from text, ontological classification of the identified keywords, categorizing the applications configured on the computing device in terms of type/genre. At the server side, the processed context is used to prepare and organize the user profile precisely by considering current context along with other attributes like user's historic interaction with the notifications which are delivered on display unit, frequently used computing device applications, preferences given to computing device applications, preferences input in at least one computing device application, historic conversation happened with one or more friends on across one or more computing device applications, etc. to predict user's profile. The interaction with notifications can be like impressions, clicks, views, etc. and hence can be determined, user's favorite brand, restaurant, activity, etc. The current context is processed by means of language model, which is used to process the information by identifying type of language, n-grams of information associated with current context, comparing the language entered with dictionaries present on the computing device. In addition to these, the language model also applies syntagmatic methods to predict the current intent of user. The current contextual information is the information of what user is entering in an editor of an application or current information of user interaction with an application or current location, time.

The Hyper-contextual database 1060 receives hyper-contextual information derived across one or more applications from the computing device. Such hyper-contextual information comprises of both current and historic information and is processed in Batch wise. In an embodiment, the Hyper-contextual database 1060 can be a global database present in the network environment which interacts with one or more Queue Management units and is comprised of hyper-contextual information of one or more users who interacted with applications configured on one or more computing devices where the system and method of the present invention implemented on all such computing devices. Queue Management units includes information regarding trending keywords in real-time. The trending keywords are prioritized based on usage/preference. In addition to hyper-contextual information described as above, the Hyper-contextual database 1060 also considers factors like number of times user interacted with the content taken place at notification area, number of times user utilized the content provided by systems and methods of present invention, number of times user ignored the content and the like. The hyper-contextual information is transferred to the Prediction server 1070 which comprises of Intent Prediction Engine and a User Profiling Unit. The User profiling unit and the Intent Prediction Engine of Prediction server 1070 are interconnected to each other. In particular embodiments, hyper-contextual information comprises of current and historic conversation of user with friends, current and historic search information, current and historic interaction with one or more social networking applications configured on one or more computing devices, etc. The Intent Prediction Engine predicts and stores intents of one or more users and the predicted intents are prioritized using a ranking system. The User profiling unit categorizes or classify users based on predicted intent. The Content processing unit 1010 comprises of global intent information mapped to one or more content identification codes. In this component, the global intent information is ranked as per the impressions and/or interactions with the content provided to the respective computing devices. The prediction server 1070 combines the user profiling information and global intent information from the Content Processing Unit 1010 at the Storage Unit 1080 and transfers the prioritized intent information along with the respective content identification codes to the Service Processing unit 1090. The contextual information from the Current contextual database 1040 is associated with the information received from the Storage Unit 1080 to make the system and method of the present invention a real-time process and the final content is identified and served to the computing device. The complete information is then transferred to the computing device 1020. A prediction engine is configured on the computing device 1020 where the current contextual information is processed by means of a grammar rule to determine at least one intent. The prediction engine utilizes the information received from the Service Processing unit 1090 to serve each user a content that is relevant and accurate in real-time. The Storage Unit 1080 maps one or more intents with one or more sets of content identification codes, which are associated with respective content, of the Content Processing Unit 1010, in real-time.

Content identification codes are classified into one or more categories and are given a range and each category can be termed as Advertisers, Information related to system of the present invention, Content providers, Local discoveries. The categories are arranged in a database format and stored on Content server and gets updated dynamically. The range is given for a particular content identification code which is mapped to one or more intents.

Advertisers can be partners or affiliates who purchases one or more intents or keywords. Information related to system of the present invention can be the features/updates of the application which is integrated with system of the present invention. Content providers provide content which is served to the users based on their interests. Local discoveries are service providers and are providing service or information for the users at the point of need, which is extracted based on their context like intent, time and location.

Each said content type is extracted from corresponding databases based on the content type that is identified and notified to the user.

For an instance, in one example Advertisers have code range between 0 to 10000, Information related to system of current invention shall have code range 10001 to 50000, Content providers or Service providers shall have code range of 50001 to 100000, and Local discoveries shall have code range greater than 100001.

In some cases, content from multiple databases can be shown to user. That is based on user's current text input and demographics. The content identification codes are again prioritized dynamically based on user's current text input and demographics.

In one embodiment of the invention, data is derived from multiple applications and analyzing them on computing device or at server side. In case, if we send the data which is aggregated from multiple applications to the server, the data shall be analyzed using Recommendation engine, and the analyzed data is further transferred to the computing device dynamically. Further to it, an intent is identified using the analyzed data and current text input from the user. One way to identify the intent is by associating the analyzed data with the current text input. Further to it the intent is transferred to the Content server to pull the content which is mapped to the intent. This establishes a real time scenario so that when the user types/enters text, he can see the results immediately.

In general, the existing prior art pull data from device, send data to server, analyze the data at server and then when user type text, the result are pulled from server and get displayed on computing device. While in the current invention, the results are not rendered directly from the server, rather the results are displayed on computing device after identifying the intent on the computing device.

As will be appreciated by one of skill in the art, the present invention may be embodied as a method, and apparatus. Accordingly, the present invention may take the form of an entirely hardware embodiment, a software embodiment or an embodiment combining software and hardware aspects. It will be understood that each block of the block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

What is claimed is:

1. A method, comprising:
aggregating, at a computing device, a set of information associated with one or more platforms built in the computing device, wherein the aggregated information is stored on the computing device, wherein platforms of the one or more platforms are associated with differing entities;
processing, by a recommendation unit at the computing device, the aggregated information to identify a set of attributes, wherein the set of attributes are mapped to at least one content of the aggregated information;
identifying, at the computing device, the at least one content based on any intent of one or more users at a particular time, wherein the any intent of one or more users is determined by the computing device based at least on the aggregated information stored on the computing device, wherein mapping information of content identification codes associated with at least one of the intents is ranked by the computing device; and
displaying, by the computing device, the identified content on the computing device in real-time.

2. The method as claimed in claim 1, wherein the one or more platforms are one of a similar type or a different type and wherein the one or more platforms are part of the computing device and an operating system information thereof.

3. The method as claimed in claim 1, comprises:
transferring the aggregated information to a first database in real-time; and
transferring relevant information associated with the aggregated information and the computing device to a second database in real-time.

4. The method as claimed in claim 3, comprises:
transferring the relevant information from the second database to a first server so as to predict and store intents of one or more users of the computing device, wherein the predicted intents are prioritized using a set of ranking parameters, and wherein the one or more users are categorized based on the predicted intent.

5. The method as claimed in claim 4, comprises:
receiving profile information and intent information of the one or more users;
combining, at a second server, the profile information and the intent information of the one or more users with global intent information received from a third server to prioritize the intent information, wherein the third server is in communication with the computing device; and
transferring the prioritized intent information along with associated identification tags to a processing unit.

6. The method as claimed in claim 5, comprises:
receiving, at the processing unit, the aggregated information from the first database;
associating said received data with the received prioritized intent information to identify the content to be displayed on the computing device; and
transferring the identified content to the computing device.

7. A system, comprising:
a computing device comprising one or more processors;
an information aggregation unit, implemented by the one or more processors, configured to aggregate information associated with one or more platforms built in the computing device, wherein the aggregated information is stored on the computing device, wherein platforms of the one or more platforms are associated with differing entities;
a recommendation unit, implemented by the one or more processors, configured to process the aggregated information to identify a set of attributes, wherein the set of attributes are mapped to at least one content of the aggregated information; and
a content processing unit, implemented by the one or more processors and being operatively coupled to the recommendation unit, configured to identify the at least one content based on any intent of one or more users at a particular time, wherein the any intent of one or more users is determined by the one or more processors based on the aggregated information stored on the computing device, wherein mapping information of content identification codes associated with at least one of the intents is ranked by the computing device, and wherein the one or more processors is configured to display the identified content.

8. The system as claimed in claim 7, wherein the one or more platforms are one of a similar type or a different type and wherein the one or more platforms are part of the computing device and an operating system information thereof.

9. The system as claimed in claim 7, comprises:
   a receiving unit operatively coupled with the computing device;
   a queue management unit operatively coupled with the receiving unit, a first database, and a second database, wherein the queue management unit is configured to:
      transfer the aggregated information to the first database in real-time; and
      transfer relevant information associated with the aggregated information and the computing device to the second database in real-time.

10. The system as claimed in claim 7, wherein the relevant information is transferred from the second database to a first server so as to predict and store intents of one or more users of the computing device, wherein the predicted intents are prioritized using a set of ranking parameters, and wherein the one or more users are categorized based on the predicted intent.

11. The system as claimed in claim 10,
   wherein the first server is configured to receive profile information and intent information of the one or more users,
   wherein the profile information and the intent information of the one or more users are combined at a second server with global intent information received from a third server to prioritize the intent information, wherein the third server is in communication with the computing device; and
   wherein the prioritized intent information along with associated identification tags are transferred to a processing unit, operatively connected to the first database and the second server.

12. The system as claimed in claim 7,
   wherein the aggregated information are received at the processing unit from the first database;
   wherein said received data is associated with the received prioritized intent information to identify the content to be displayed on the computing device; and
   wherein the identified content is transferred to the computing device.

* * * * *